United States Patent
Azizan et al.

(10) Patent No.: US 11,264,814 B2
(45) Date of Patent: Mar. 1, 2022

(54) METHOD AND APPARATUS FOR CONNECTING A BATTERY POWER SOURCE TO A PORTABLE ELECTRONIC DEVICE

(71) Applicant: MOTOROLA SOLUTIONS, INC., Chicago, IL (US)

(72) Inventors: Muhamad Ridzuan Azizan, Baling (MY); Chen Kok Yeoh, Bukit Mertajam (MY); Wai Mun Lee, Ipoh (MY); Mohd Faisal Abdullah, Gelugor (MY); Kow Chee Chong, Bayan Lepas (MY); Macwien Krishnamurthi, Shah Alam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 174 days.

(21) Appl. No.: 16/869,627

(22) Filed: May 8, 2020

(65) Prior Publication Data

US 2021/0351600 A1 Nov. 11, 2021

(51) Int. Cl.
*H02J 7/00* (2006.01)
*H01M 50/528* (2021.01)

(52) U.S. Cl.
CPC ......... *H02J 7/0029* (2013.01); *H01M 50/528* (2021.01); *H02J 7/0045* (2013.01)

(58) Field of Classification Search
CPC ..... H02J 7/0029; H02J 7/0045; H01M 50/528
USPC ......................................... 320/107, 114, 163
See application file for complete search history.

(56) References Cited

U.S. PATENT DOCUMENTS

| | | |
|---|---|---|
| 3,708,694 A | 1/1973 | Evans |
| 4,945,262 A | 7/1990 | Plasecki |
| 5,809,519 A | 9/1998 | Lee |
| 5,831,351 A | 11/1998 | Khosrowpour et al. |
| 6,927,555 B2 | 8/2005 | Johnson |
| 7,424,312 B2 | 9/2008 | Pinder et al. |
| 7,952,321 B2 | 5/2011 | Spartano |
| 8,909,173 B2 | 12/2014 | Harmke |
| 9,465,761 B2 | 10/2016 | Decesaris et al. |
| 9,254,018 B2 | 12/2016 | Sultenfuss et al. |

(Continued)

FOREIGN PATENT DOCUMENTS

EP 3226368 10/2017

OTHER PUBLICATIONS

"Integrated Voltage Limiters for Automotive Applications." Maxim, https://www.maximintegrated.com/en/app-notes/index.mvp/id/3895, Sep. 13,2006; 4 pages.

(Continued)

*Primary Examiner* — Edward Tso
*Assistant Examiner* — Aaron Piggush (57) ABSTRACT

Battery circuitry forms part of apparatus for connecting a battery power source to a portable electronic device. The battery circuitry is configured to detect a transitioning of an enable signal, caused by actuation of a power switch, from a de-asserted state to an asserted state. In response to detecting the transitioning of the enable signal, the battery circuitry is further configured to open an electrical path within the battery circuitry. The path, when opened, connects the battery power source in a manner that permits powering on of the portable electronic device.

20 Claims, 5 Drawing Sheets

(56) References Cited

U.S. PATENT DOCUMENTS

2003/0231002 A1* 12/2003 Johnson .................. H02J 7/007
                                                        320/112
2016/0049815 A1   2/2016 Wu et al.
2016/0072315 A1*  3/2016 Maltsev ................ H02J 7/0016
                                                        320/118

OTHER PUBLICATIONS

Ultra-Small, Overvoltage Protection/Detection Circuits. MAX16010-MAX16014, 2015; 12 pages.
Lee, Wai Mun et al.: "ADynamic Battery Voltage Restriction for Hazardous Environments", U.S. Appl. No. 16/490,816, filed Oct. 2, 2019, all pages.
Alfaro, Javier et al.: "Asynchronous Multi-Purpose Battery Interface", U.S. Appl. No. 16/823,022, filed Mar. 18, 2020, all pages.

* cited by examiner

METHOD AND APPARATUS FOR CONNECTING A BATTERY POWER SOURCE TO A PORTABLE ELECTRONIC DEVICE

BACKGROUND

Feature rich portable electronic devices require ever increasing amounts of energy from batteries in terms of higher peak load currents and higher average load currents. For example, radios have evolved from simple analog devices with peak transmission power demands to multi-function computing systems in which different software-controlled modes have different peak current demands. Battery packs and battery cells thereof are growing in terms of capacity and increased voltage ratings due to the introduction of improved battery chemistries and a demand for higher power and capacity.

Power savings and efficiency is also desirable since this may impact the amount of time before a battery used to power the electronic device needs to be recharged. One way in which power savings and efficiency may be improved is by trying to minimize unnecessary loss of battery charge when the battery-powered electronic device has been turned off.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a method for signal communications over an interface between power-consuming circuitries of a portable electronic device and associated battery circuitry. Before the portable electronic device is powered on, an enable signal is provided, initially in a de-asserted state, at the interface. The enable signal is at least partly controlled by a power switch of the portable electronic device. Also before the portable electronic device is powered on, the enable signal is transitioned from the de-asserted state to an asserted state by actuation of the power switch. In response to detecting the transitioning of the enable signal, an electrical path is opened within the battery circuitry. The path, when opened, connects a battery power source to the power-consuming circuitries to permit powering on of the portable electronic device. After the portable electronic device is powered on, control of a state of the path from the power switch is changed to a controlling processor forming part of the power-consuming circuitries. After the portable electronic device is powered on, a digital signal is communicated, from the controlling processor and over the interface, to control the state of the path.

According to another example embodiment, there is provided a portable electronic device housing a plurality of power-consuming circuitries. The portable electronic device includes a power switch configured to at least partly control an enable signal. The portable electronic device also includes battery circuitry and an interface between the battery circuitry and the power-consuming circuitries. The interface is configured to receive the enable signal while the portable electronic device is powered off. A controlling processor is configured to communicate a power controlling signal over the interface to the battery circuitry. The battery circuitry is configured to detect a transitioning of the enable signal from a de-asserted state to an asserted state, the transitioning being caused by actuation of the power switch. In response to detecting the transitioning of the enable signal, the battery circuitry is further configured to open an electrical path within the battery circuitry. The path, when opened, connects a battery power source to the power-consuming circuitries to permit powering on of the portable electronic device. The battery circuitry is additionally configured to change, after the portable electronic device is powered on, control of a state of the path from the power switch to the controlling processor that outputs the power controlling signal.

In this document, various example values are provided for electronic components for at least the reason of facilitating an understanding of various details of example embodiments. For instance, certain resistance and capacitance values are provided for resistors and capacitors respectively. These example component values are not intended to be limiting and will be understood by those skilled in the art to vary as between different specific circuit implementations.

Electrical equipment that is meant to be installed in hazardous locations, including land mobile radios and other portable electronic devices, should be specially designed and tested to ensure that they do not initiate an explosion due to arcing contacts or the high surface temperature of the equipment. For example, a radio may be restricted in terms of power consumption or current consumption to satisfy compliance with one or more standards (for example, explosive environment standard or other relevant standard) including Appareils destinés à être utilisés en ATmosphères EXplosibles (ATEX), Underwriters Laboratories (UL), and International Electrotechnical Commission System for Certification to Standards Relating to Equipment for Use in Explosive Atmospheres (IECEx). The maximum allowable capacitance listed in the HAZardous LOCation (HAZLOC) standards for portable electronic devices is inversely related to the voltage rating for the battery being used. In apparent conflict with this reality, battery packs and battery cells thereof are growing in terms of capacity and increased voltage ratings due to the introduction of improved battery chemistries and a demand for higher power and capacity.

Thus, the above-described increasing voltage ratings may pose a risk for products intended for use in hazardous locations (e.g., so-called "HAZLOC products") and subject to UL div 1 and ATEX standards for operation in hazardous locations. Since the maximum allowable capacitance listed in the HAZLOC standards for portable electronic devices is inversely related to the voltage rating for the battery being used, the increase in the voltage ratings over time means that the maximum capacitance usable for a radio, for example, is decreasing as radio designs are becoming getting more complex. For example, radio designers are continuing to add functional features and connectivity features in terms of application processing, baseband processing, LTE, WiFi, etc.

In dual-cell battery packs, the voltage ratings for the two cells have been increasing from a maximum voltage rating of 4.2V (resulting in an overall voltage rating of 8.4V for the battery pack) to a maximum voltage rating of 4.5V (resulting in an overall voltage rating of 9V for the battery pack), with a corresponding increase in energy density. In the future, voltage ratings for individual battery cells may reach 4.8V per cell (resulting in an overall voltage rating of 9.6V for a dual-cell battery pack). Increasing battery voltage ratings from 8.4V to 8.8V or, in the future, 9V, 10V, or more, may in general improve the battery capacity (for example, the peak power handling capability) but this higher voltage rating may not be compatible with HAZLOC equipment protection standards.

Each of the above-mentioned embodiments will be discussed in more detail below, starting with example system and device architectures of the system in which the embodiments may be practiced, followed by an illustration of processing blocks for achieving an improved technical method, device, and system for adaptive active current limit protection. Example embodiments are herein described with reference to flowchart illustrations and/or block diagrams of methods, circuit schematic diagrams and apparatus (systems) according to example embodiments. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

Further advantages and features consistent with this disclosure will be set forth in the following detailed description, with reference to the figures.

Figure 1:
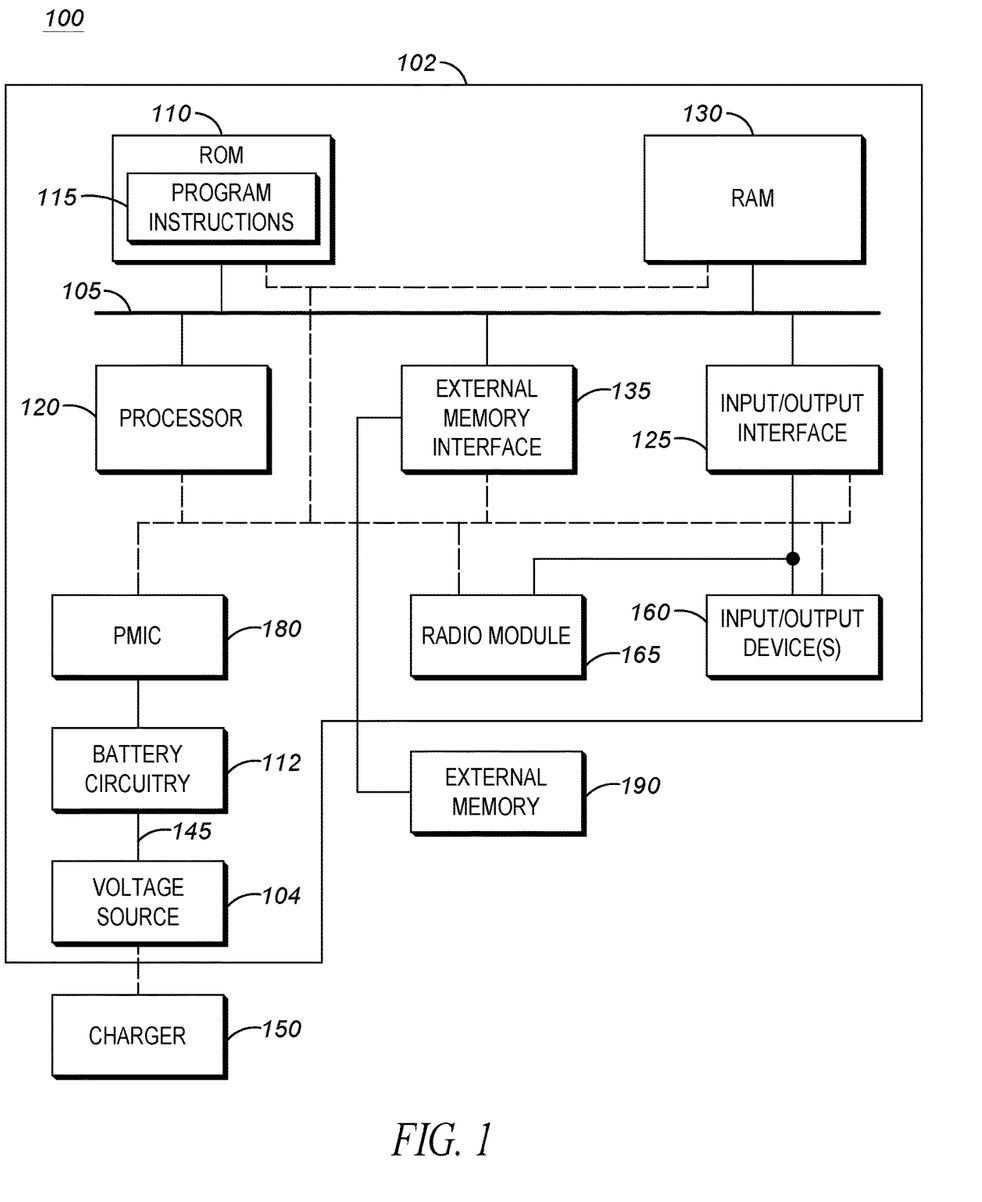
FIG. 1 is a block diagram illustrating a portable electronic communication device in accordance with an example embodiment.

Referring now to the drawings, and in particular FIG. 1, there is a block diagram illustrating a portable electronic communication device 100 in accordance with an example embodiment. The illustrated portable electronic communication device 100 includes, amongst other things, a device housing 102, a voltage source 104, battery circuitry 112, an analog radio module 165, and one or more input/output devices 160. The portable electronic communication device 100 may be any type of portable electronic communication device for which power can be supplied, at least at certain times, by the voltage source 104. At certain times, the voltage source 104 may be coupled to a charger 150 to charge the battery cells of the voltage source 104. In some examples, the portable electronic communication device 100 may be a multifunction radio, a land mobile radio, a mobile telephone, or another type of portable electronic communication device configured for operating in a hazardous environment. In other examples, the portable electronic communication device 100 may be or include a laptop computer, a tablet computer, a smart phone, a lighting system, a sound system, or some other type of portable electronic device.

In some examples, the voltage source 104 may include multiple battery cells with a combined maximum voltage rating that may exceed a predefined maximum permitted voltage for operation of the portable electronic communication device 100 in a hazardous environment. In various examples, the voltage source 104 may provide electrical power to an electronic processor 120, the analog radio module 165, and the input/output devices 160 as the load. In some examples, a digital signal indicating a current or voltage measurement taken within the voltage source 104 may be selectively provided to the electronic processor 120 over one or more data lines. In some examples, other operating parameters of the battery pack may be obtained by software operating on the electronic processor 120. For instance, in some examples the operating parameters of the voltage source 104, or of a particular battery cell forming part of same, may be read from a memory (that stores battery data) integrated into the voltage source 104. The operating parameters of the voltage source 104 (or a battery cell of same) obtainable by the electronic processor 120 may include, but are not limited to, a state-of-charge of the voltage source or a battery cell thereof, a battery cell type, a battery pack or cell topology, the available capacity of the voltage source or a battery cell thereof, a peak or present charging capacity of the voltage source or a battery cell thereof, a nominal voltage range for the voltage source or a battery cell thereof, the temperature of the voltage source or a battery cell thereof, an indication of the age of the voltage source or a battery cell thereof, the number of charge-discharge cycles the voltage source or battery cell has experienced, or a measure of impedance for the voltage source or a battery cell thereof.

As illustrated in this example embodiment, the portable electronic communication device 100 may include a Read Only Memory (ROM) 110, the Random Access Memory (RAM) 130, the electronic processor 120, a Power Management Integrated Circuit (PMIC) 180 (for example, a PMIC semiconductor die), the battery circuitry 112, an input/output interface 125, and an external memory interface 135, all of which may be coupled to a system bus 105 through which they communicate with each other. In various examples, electronic processor 120 may include a microprocessor, a microcontroller, a system-on-chip, a field-programmable gate array, a programmable mixed-signal array or, in general, any system or sub-system that includes nominal memory and that is capable of executing a sequence of instructions in order to control hardware elements of the portable electronic communication device 100. In this example embodiment, the ROM 110 stores program instructions 115, at least some of which may be executed by the electronic processor 120 to implement, in conjunction with the analog radio module 165 and/or the input/output devices 160, various functions of the portable electronic communication device 100. In some examples, the program instructions 115 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. In this example embodiment, the RAM 130 may, from time to time, store data representing battery data or operating parameters of the voltage source 104, or of particular battery cells thereof, to be used in performing various power management functions on behalf of the portable electronic communication device 100. In some examples, the RAM 130 may also store data used in performing other functions of the portable electronic communication device 100.

In some examples, the battery circuitry 112 receives electrical power 145 from the voltage source 104 and may, when necessary, reduce the voltage at which the electrical power is supplied to other elements of the portable electronic communication device 100 below a predefined maximum permitted voltage for operating the portable electronic communication device 100 in a hazardous environment. In other examples, the above described voltage reduction is not carried out at all such that the portable electronic communication device 100 is of a type intended for a non-hazardous environment.

Still with reference to the illustrated example embodiment, the input/output interface 125 may include one or more analog input interfaces, such as one or more A/D convertors, or digital interfaces for exchanging signals or data with the analog radio module 165. The input/output interface 125 may also include interfaces through which the electronic processor 120 may be coupled to other elements of the portable electronic communication device 100. For example, the electronic processor 120 may be indirectly connected to the input/output devices 160 that implement other functionality features of the portable electronic communication device 100, such as a keyboard, a mouse, a touch panel, a switch, a microphone, a video camera, a display, a speaker, one or more sensors, and the like over the input/output interface 125. In the illustrated example embodiment, the electronic processor 120 is shown indirectly connected to the analog radio module 165 and the input/output devices 160.

Operation of the analog radio module 165 to initiate and establish connection of the portable electronic communication device 100 to a Radio Access Network (RAN) is contemplated. RANs may operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

Still with reference to FIG. 1, the external memory interface 135 may include one or more interfaces through which the portable electronic communication device 100 may be coupled to an external memory 190. The external memory 190 may include, for example, a Hard-Disk Drive (HDD), an optical disk drive such as a Compact Disk (CD) drive or Digital Versatile Disk (DVD) drive, a Solid State Drive (SSD), a tape drive, a flash memory drive, or a tape drive, to name a few.

Figure 2:
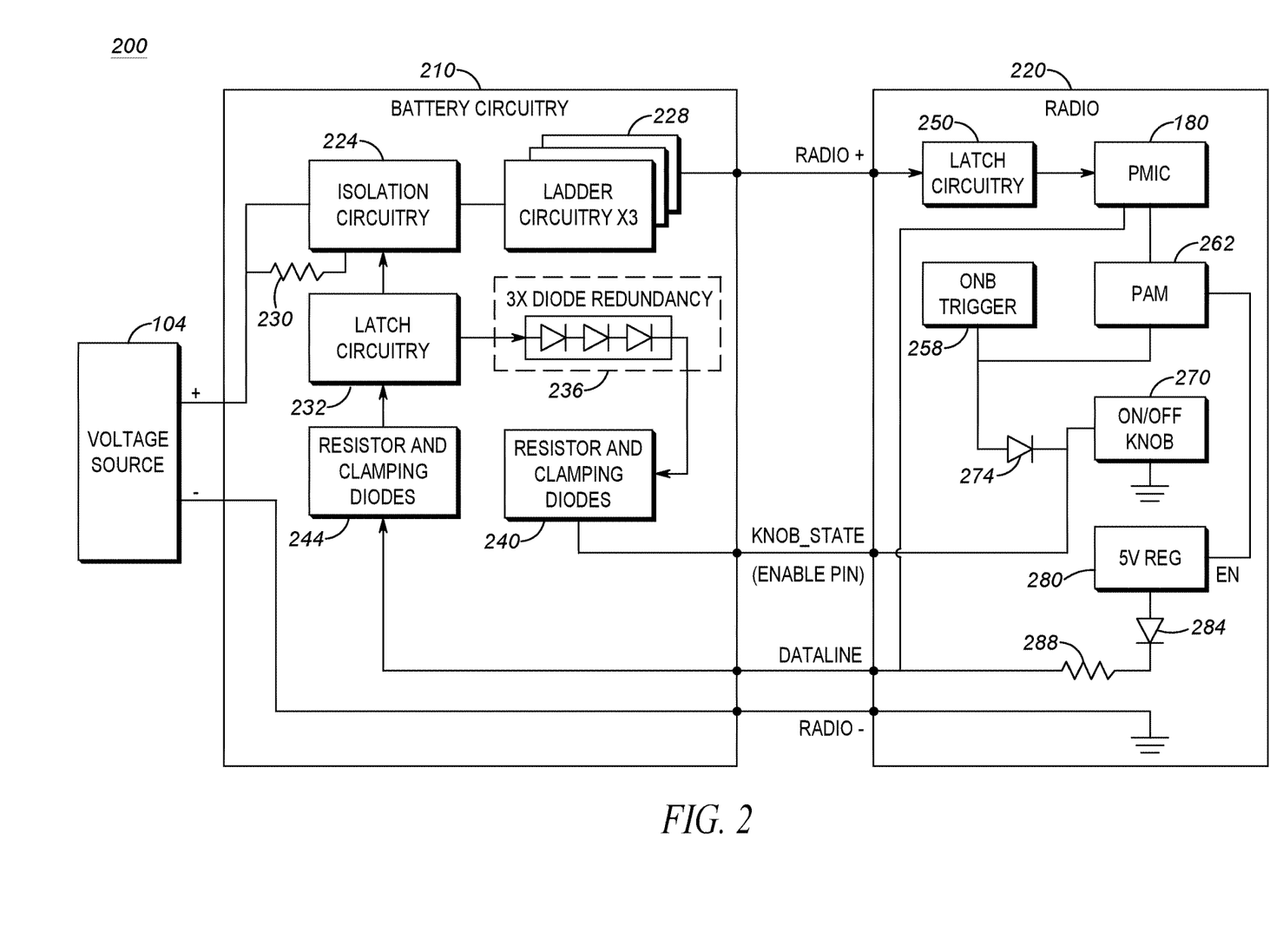
FIG. 2 is a block diagram illustrating another portable electronic communication device in accordance with an example embodiment.

Reference will now be made to FIG. 2. FIG. 2 is a block diagram illustrating another portable electronic communication device 200 in accordance with an example embodiment. In some examples, the portable electronic communication device 200 may be similar to the portable electronic communication device 100 of FIG. 1 (i.e. the component blocks shown in FIG. 1 may be included in the portable electronic communication device 200 and vice versa in respect of the portable electronic communication device 100). The portable electronic communication device 200 includes the voltage source 104 which is coupled to battery circuitry 210, which is further coupled to power-consuming circuitry (labelled as "radio 220").

Regarding the battery circuitry 210, this includes isolation circuitry 224, ladder circuitry 228, a resistor 230, latch circuitry 232, three series connected diodes 236, a first grouping of clamping diodes plus resistor 240 and a second grouping of clamping diodes plus resistor 244.

In terms of the isolation circuitry 224, this selectively isolates the radio 220 from a positive polarity voltage of the voltage source 104. The isolation circuitry 224 is coupled to the resistor 230 which functions as a Field Effect Transistor (FET) pull up resistor (although shown as separate from the isolation circuitry 224, in some examples the resistor 230 can alternatively be included within the isolation circuitry 224). The isolation circuitry 224 is coupled to the positive terminal of the voltage source 104. The isolation circuitry 224 is also coupled to the latch circuitry 232 which is configured to selectively activate the isolation circuitry 224 to change to its conducting state in response to a change in knob state from a de-asserted state to an asserted stated. In some examples this means detecting a negative edge of KNOB_STATE transition (i.e. floating/unknown logic level to the LOW logic level, or alternatively the HIGH logic level to the LOW logic level).

In terms of the second grouping of clamping diodes plus resistor 244 that is coupled between the latch circuitry 232 and a DATALINE input at an interface to the radio 220, this is included for the purpose of Electro-Static Discharge (ESD) protection and for current limiting. There is also a KNOB_STATE input at the interface to the radio 220, and the latch circuitry 232 is coupled to this as well via the three series connected diodes 236 (which facilitates a sufficient voltage drop to the connected ENABLE pin for meeting the HAZLOC mandated voltage at that pin) as well the first grouping of clamping diodes plus resistor 240 included for the purpose of Electro-Static Discharge (ESD) protection and for current limiting.

Regarding the ladder circuitry 228 that is coupled in-between the isolation circuitry 224 and the RADIO+ input at the interface to the radio 220, this facilitates a sufficient voltage drop for meeting the HAZLOC mandated voltage to the connected pin.

Regarding the radio 220, this includes latch circuitry 250, the PMIC 180, ONB trigger 258, Power Analog Module (PAM) 262, user manipulatable ON/OFF knob 270 (for example, a physically rotatable knob exposed on a surface of the portable electronic communication device 200), diode 274 (provided for reverse protection of the ONB trigger 258), regulator 280, diode 284 and resistor 288 (22 kΩ in one example). Regarding the latch circuitry 250, this is coupled in-between the RADIO+ input and the PMIC 180. The latch circuitry 250 provides for backwards compatibility in the case where the portable electronic communication device 200 is non-HAZLOC.

Regarding the ONB trigger 258, this is a trigger latch circuit operating when the radio 220 powers on.

Regarding the PAM 262, this a power operation module that operates to control and take care of the power ON/DOWN sequencing.

Regarding the regulator 280, this is coupled between the PAM 262 and an anode of the diode 284 to regulate a signal voltage on DATALINE.

Regarding the diode 284 and the resistor 288, these are provided to make sure that shutdown does not transpire to quickly when the user manipulatable ON/OFF knob 270 is moved to an off position (i.e. to avoid having the DATA-LINE signal going HIGH too quickly).

Figure 3:
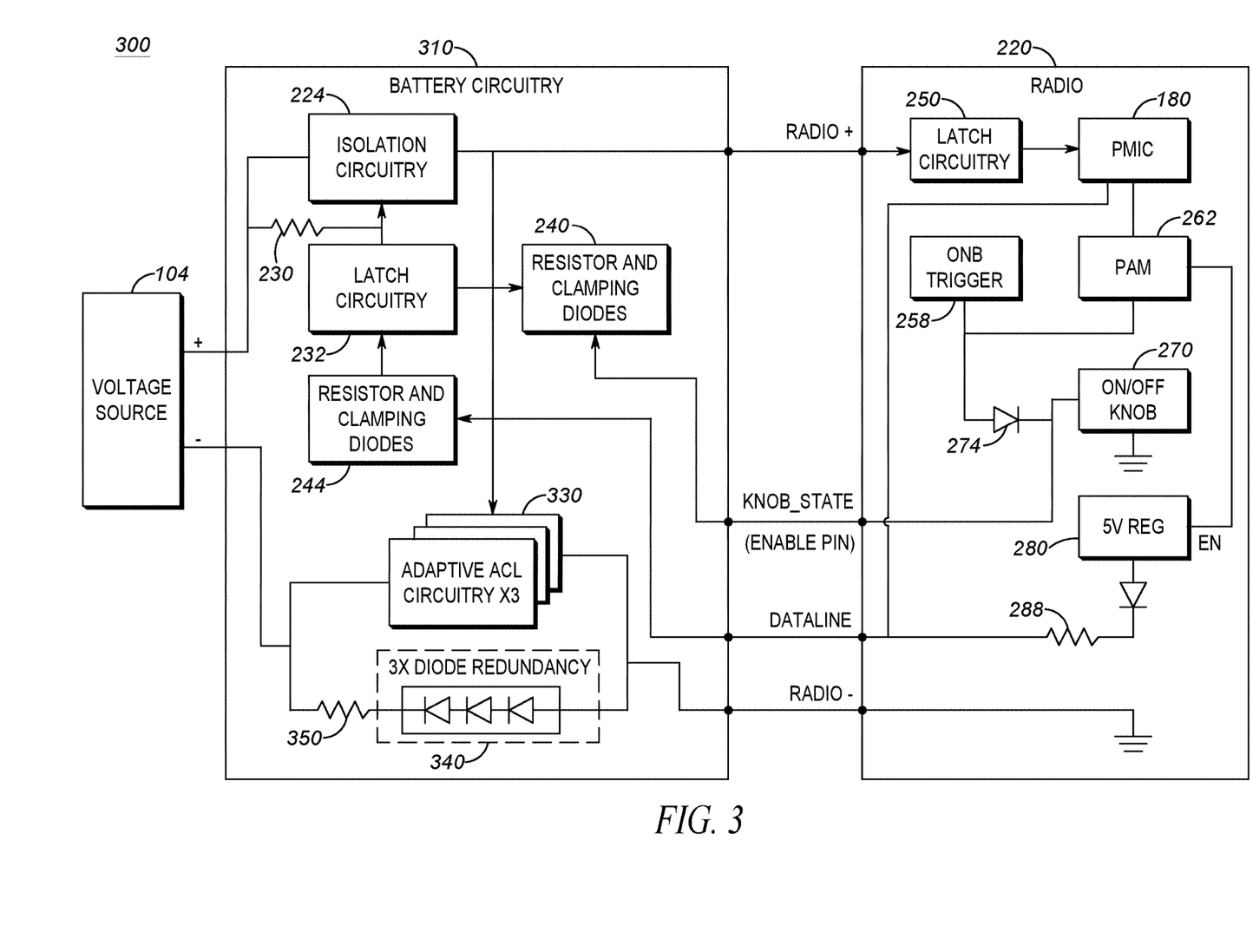
FIG. 3 is a block diagram illustrating yet another portable electronic communication device in accordance with an example embodiment.

Reference is now made to FIG. 3, a block diagram illustrating a portable electronic communication device 300 in accordance with an example embodiment. The main difference between the portable electronic communication device 300 and the portable electronic communication device is battery circuitry 310 instead of battery circuitry 210. The battery circuitry 310 is similar in a number of respects to the battery circuitry 210, except the ladder circuitry 228 and the three series connected diodes 236 are absent, and instead there are three adaptive active current limit circuitries 330, three series connected diodes 340 and a resistor 350. Regarding the three adaptive active current limit circuitries 330, these are configured to become activated when a reduced voltage needs to be derived from an output voltage provided by the voltage source 104. Further details of the three adaptive active current limit circuitries 330, the three series connected diodes 340 and the resistor 350 are described in co-pending U.S. patent application Ser. No. 16/869,620 entitled "APPARATUS AND METHOD FOR ADAPTIVE ACTIVE CURRENT LIMIT PROTECTION", the entire contents of which are herein incorporated by reference.

Figure 4:
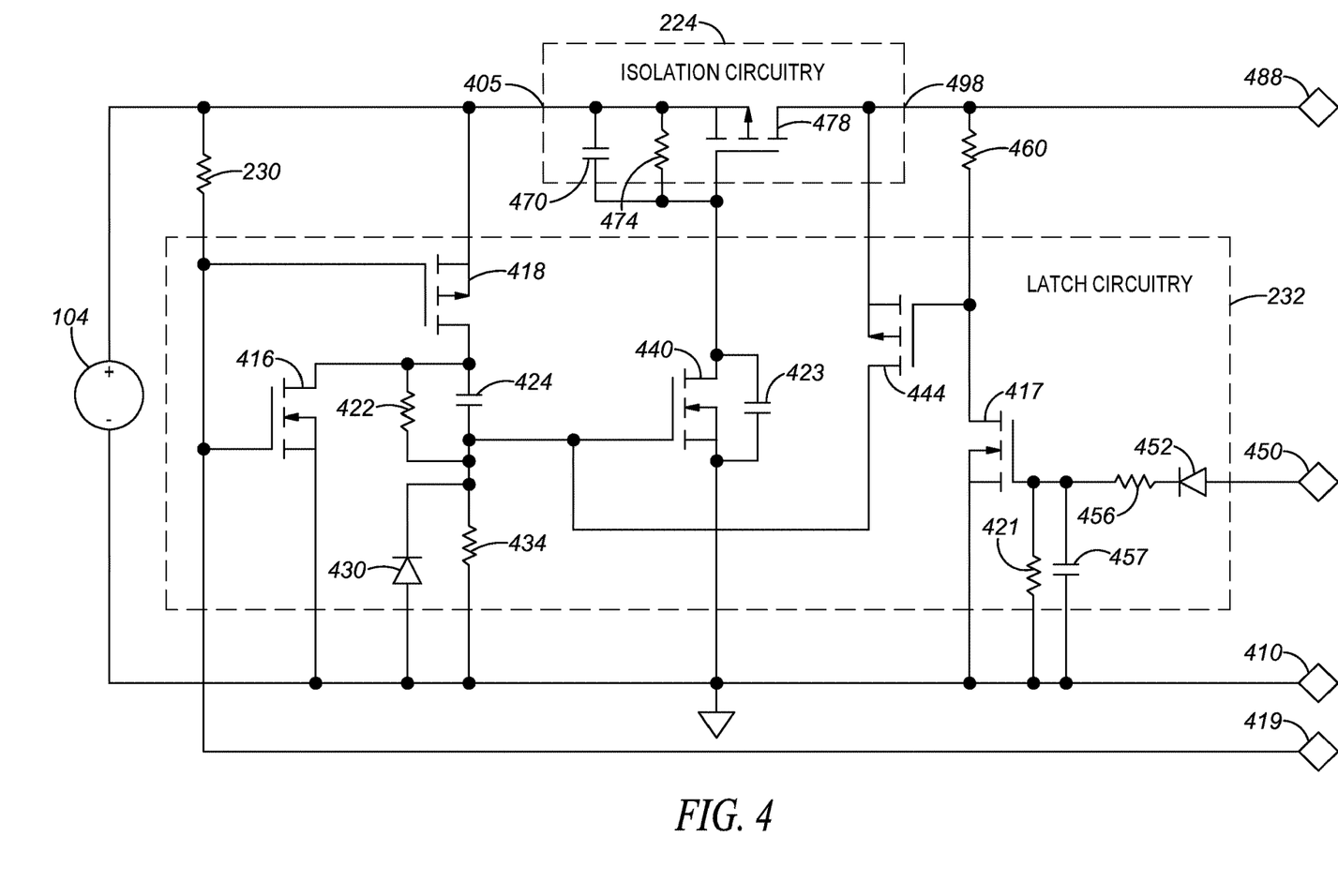
FIG. 4 is a circuit schematic diagram providing additional detail in relation to isolation circuitry and latch circuitry of the battery circuitries shown in FIGS. 2 and 3.

FIG. 4 is a circuit schematic diagram providing additional detail in relation to the isolation circuitry 224 and the latch circuitry 232 of the battery circuitries shown in FIGS. 2 and 3. As shown in FIG. 4, a positive terminal of the voltage source 104 is coupled to an input 405 of the isolation circuitry 224, whereas a negative terminal of the voltage source 104 is coupled to a node 410 that is connected to the RADIO-terminal of the radio 220.

Also coupled to the positive terminal of the voltage source 104 is the resistor 230 (1000 kΩ in one example) having a first terminal coupled the input 405 and a second terminal coupled a gate of NFET 416, a gate of PFET 418, and a node 419 that is indirectly coupled to the KNOB_STATE input of the radio 220. A source of the PFET 418 is coupled to the input 405. A drain of the PFET 418 is coupled to a first terminal of resistor 422 (2000 kΩ in one example) and a first terminal of capacitor 424 (1 μF in one example), which is coupled in parallel with the resistor 422. The drain of the PFET 418 is also coupled a drain of the NFET 416. It will be understood that the NFET 416 provides a discharge path for the capacitor 424. By contrast charging of the capacitor 424, which takes longer than discharging, is carried out through a path provided by the PFET 418.

Regarding the negative terminal of the voltage source 104, in addition to being coupled to the node 410 it is also coupled to a source of the NFET 416 and first terminals of a diode 430 (which helps in providing a fast discharge of the capacitor 424) and a resistor 434 (100 kΩ in one example), the two of which are coupled in parallel. The negative terminal of the voltage source 104 is also coupled to a source of NFET 417, and to a first terminal of resistor 421 (470 kΩ in one example). The negative terminal of the voltage source 104 is also coupled to the source of NFET 440, and to a first terminal of capacitor 423 (0.47 μF in one example), which is coupled in parallel with the NFET 440.

The second terminals of the diode 430 and the resistor 434 are coupled to second terminals of the resistor 422 and the capacitor 424. The second terminals of the diode 430 and the resistor 434 are also coupled to a gate of NFET 440, and to a drain of PFET 444.

Still with reference to FIG. 4, a node 450 is also shown, which is indirectly coupled to the DATALINE input of the radio 220. The node 450 is connected to an anode of diode 452. The cathode of the diode 452 is connected to a first terminal of resistor 456 (100 kΩ in one example). A second terminal of the resistor 456 is coupled to a first terminal of a capacitor 457 (0.1 μF in one example), a first terminal of the resistor 421 and a gate of the NFET 417. A second terminal of the capacitor 457 is coupled to a second terminal of the resistor 421. A drain of the NFET 417 is coupled to a gate of the PFET 444, and to a first terminal of resistor 460.

Reference is now made to the isolation circuitry 224 at the top of the FIG. 4. The illustrated isolation circuitry 224 includes a capacitor 470 (0.68 μF in one example) and a resistor 474 (50 kΩ in one example) coupled in parallel. The illustrated isolation circuitry 224 also includes a PFET 478. A source of the PFET 478 is coupled to the input 405 and first terminals of the capacitor 470 and the resistor 474. A gate of the PFET 478 is coupled to second terminals of the capacitor 470 and the resistor 474, as well as certain circuit elements in the latch circuitry 232. In particular, a second terminal the capacitor 423 and the drain of the NFET 440 are coupled to the gate of the PFET 478.

Still with reference to the isolation circuitry 224, the drain of the PFET 478 is coupled to a second terminal of the resistor 460 (470 kΩ in one example), and to a node 488 (which is indirectly coupled to the RADIO+ terminal of the radio 220). The drain of the PFET 478 is also coupled to the drain of the PFET 444 within the latch circuitry 232.

In terms of operation of the illustrated circuitries, when the ON/OFF knob of the radio 220 is turned to on, this causes a signal at node 419 to transition from a floating/unknown logic level to the LOW logic level (or the HIGH logic level to the LOW logic level in alternative examples).

Because this signal is received at the gate of the PFET 418, this in turn causes the PFET 418 to turn on. After the PFET 418 turns on, the NFET 416 shuts off while the NFET 440 turn on momentarily. Once the NFET 440 turns on, the signal at the gate of the PFET 478 goes LOW turning on the PFET 478, thereby permitting the positive polarity voltage at the positive terminal of the voltage source 104 to be transmitted from the input 405 of the isolation circuitry through to output 498 of the isolation circuitry, and through the node 488 to cause the radio 220 to power up.

Once the radio 220 powers up, the PMIC 180 pulls DATALINE of the radio 220 to HIGH, and this HIGH signal is transmitted through to the latch circuitry 232 via the node 450. In response, a signal at the gate of the NFET 417 goes high turning on the NFET 417. Next, a signal at the gate of the PFET 444 goes LOW which causes the PFET 444 to turn on so that the PFET 444 can latch the state of the NFET 440 as always turned on.

Figure 5:
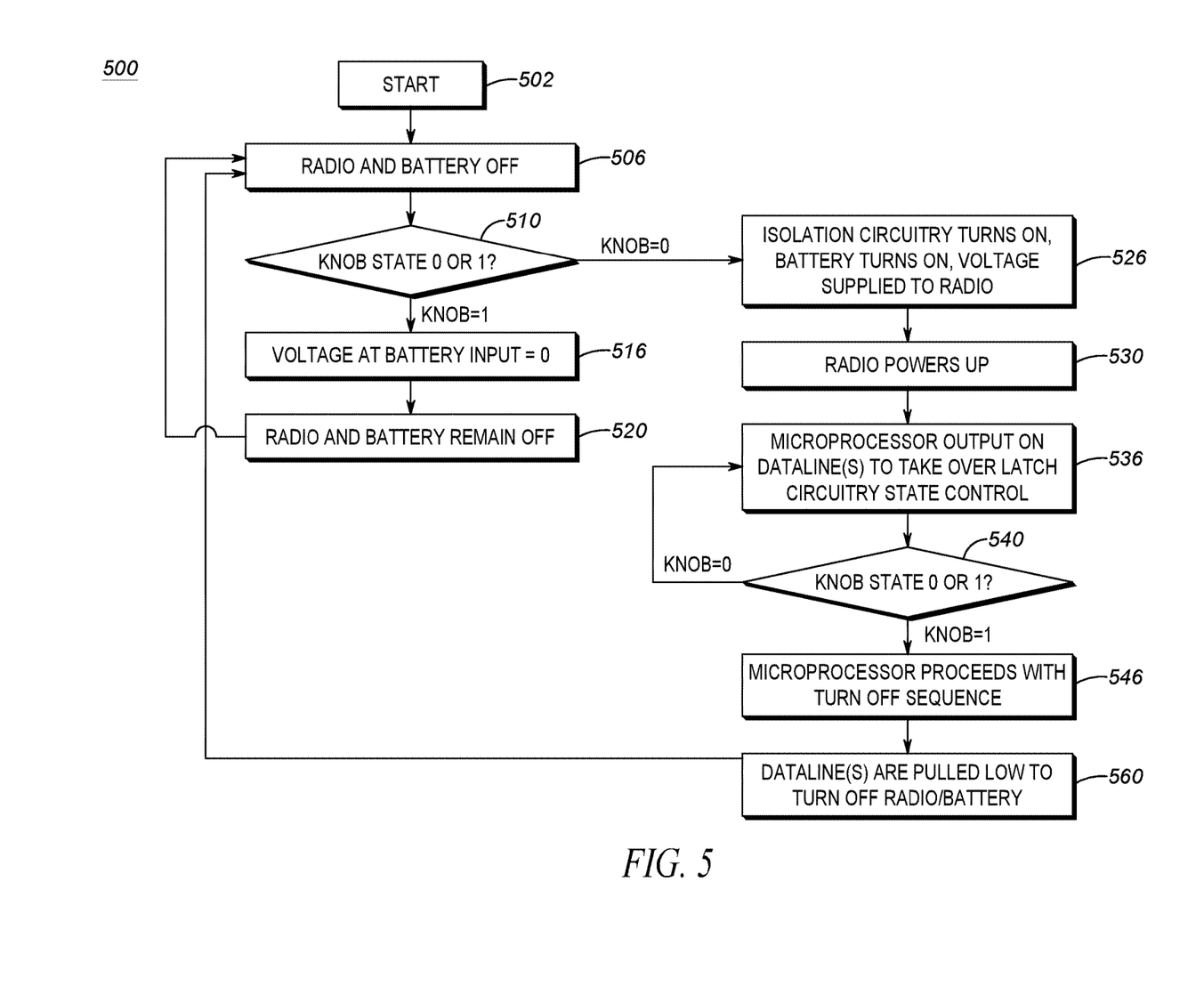
FIG. 5 is a flow chart of a method for connecting and disconnecting a battery power source to and from a mobile radio device in accordance with an example embodiment.

Reference is now made to FIG. 5. FIG. 5 is a flow chart a method 500 for connecting and disconnecting a battery power source to and from a mobile radio device in accordance with an example embodiment. After "START" 502, the action 506 follows where the radio 220 and the battery circuitry 210 are in an OFF state. Next decision action 510 follows, where the knob state of the radio 220 is either logic "0" or logic "1" (for example, the user manipulatable ON/OFF knob 270 is either ON or OFF). If the knob state is logic "1", then the voltage at the RADIO+ battery input remains (516) at 0V and action 520 follow where the radio 220 and the battery circuitry 210 remain in the OFF state.

Returning again to the decision action 510, instead of the knob state of the radio 220 remaining at logic "1", the alternative is that the knob state transitions from logic "1" to logic "0". In such case action 526 follows where the isolation circuitry 224 turns on, and then power is provided at the output of the battery circuitry 210 so that it can be delivered from the voltage source 104 to the radio 220. Next, the radio 220 powers up (530). Next, a microprocessor of the radio 220 (for example, the PMIC 180) provides a certain output onto dataline(s) of the radio 220 (for example, pulling them HIGH) to take over control of the latch circuitry 232.

Still with reference to FIG. 5, decision action 540 follows the action 536, where the knob state of the radio 220 either remains at logic "0" or alternatively transitions to logic "1" (for example, the user manipulatable ON/OFF knob 270 is either ON or OFF). If the knob state remains at logic "0", then the action 536 follows. Alternatively if the radio 220 transitions to logic "1", then the microprocessor (for example, the PMIC 180) proceeds (546) with a turn off sequence. Next, the dataline(s) are pulled LOW (560) to turn off the radio 220 and the battery circuitry 210. Next, the action 506 follows the action 560.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for signal communications over an interface between power-consuming circuitries of a portable electronic device and associated battery circuitry, the method comprising:
   before the portable electronic device is powered on:
      providing an enable signal, initially in a de-asserted state, at the interface, and
      wherein the enable signal is at least partly controlled by a power switch of the portable electronic device;
      transitioning the enable signal from the de-asserted state to an asserted state by actuation of the power switch; and
      in response to detecting the transitioning of the enable signal, opening an electrical path within the battery circuitry, wherein the electrical path when opened connects a battery power source to the power-consuming circuitries to permit powering on of the portable electronic device;

after the portable electronic device is powered on:
: changing control of a state of the electrical path from the power switch to a controlling processor forming part of the power-consuming circuitries; and
: communicating, from the controlling processor and over the interface, a digital signal to control the state of the electrical path.

2. The method as claimed in claim 1 wherein the portable electronic device is a communications device suitable for use in a hazardous environment.

3. The method as claimed in claim 2 wherein the communications device is a land mobile radio and the power switch includes a user manipulatable knob.

4. The method as claimed in claim 1 wherein the digital signal is transmitted over a dataline that extends between the controlling processor and the battery circuitry.

5. The method as claimed in claim 4 wherein the power-consuming circuitries include a plurality of processors and the controlling processor includes a power management semiconductor die.

6. The method as claimed in claim 1 wherein the battery circuitry includes isolation circuitry and latch circuitry coupled to the isolation circuitry, and wherein the isolation circuitry opens or closes the electrical path based on a voltage level established by the latch circuitry.

7. The method as claimed in claim 6 wherein further in response to the detecting the transitioning, the latch circuitry latches the asserted state.

8. The method as claimed in claim 1 further comprising initiating a power down sequence within the power-consuming circuitries when the power switch changes from an on state to an off state.

9. The method as claimed in claim 8 wherein the controlling processor changes a logic level of the digital signal, after completion of the power down sequence, from a first logic level to a second logic level, and the electrical path within the battery circuitry is closed in response to the changing to the second logic level.

10. The method as claimed in claim 1 wherein the battery circuitry includes adaptive active current limit circuitries which are activated in connection with reducing an output voltage provided by the battery power source.

11. A portable electronic device housing a plurality of power-consuming circuitries, the portable electronic device comprising:
: a power switch configured to at least partly control an enable signal;
: battery circuitry;
: an interface between the battery circuitry and the power-consuming circuitries, the interface being configured to receive the enable signal while the portable electronic device is powered off; and
: a controlling processor configured to communicate a power controlling signal over the interface to the battery circuitry, and
: the battery circuitry being configured to:
: : detect a transitioning of the enable signal from a de-asserted state to an asserted state, wherein the transitioning is caused by actuation of the power switch;
: : in response to detecting the transitioning of the enable signal, opening an electrical path within the battery circuitry, wherein the electrical path when opened connects a battery power source to the power-consuming circuitries to permit powering on of the portable electronic device; and
: : changing, after the portable electronic device is powered on, control of a state of the electrical path from the power switch to the controlling processor that outputs the power controlling signal.

12. The portable electronic device as claimed in claim 11 wherein the portable electronic device is a communications device suitable for use in a hazardous environment.

13. The portable electronic device as claimed in claim 12 wherein the communications device is a land mobile radio and the power switch includes a user manipulatable knob.

14. The portable electronic device as claimed in claim 11 further comprising a dataline that extends between the controlling processor and the battery circuitry, and wherein the power controlling signal is transmitted over the dataline when the controlling processor is controlling the state of the electrical path.

15. The portable electronic device as claimed in claim 14 wherein the controlling processor includes a power management semiconductor die.

16. The portable electronic device as claimed in claim 11 wherein the battery circuitry includes isolation circuitry and latch circuitry coupled to the isolation circuitry, and wherein the isolation circuitry is configured to open or close the electrical path based on a voltage level established by the latch circuitry.

17. The portable electronic device as claimed in claim 16 wherein the latch circuitry is configured to latch the asserted state in response to the detecting the transitioning.

18. The portable electronic device as claimed in claim 11 further comprising a housing and the battery power source, and wherein the battery power source, the battery circuitry and the controlling processor are all contained in the housing.

19. The portable electronic device as claimed in claim 11 wherein the battery circuitry includes a plurality of adaptive active current limit circuitries which are configured to become activated when a reduced voltage needs to be derived from an output voltage provided by the battery power source.

20. The portable electronic device as claimed in claim 19 wherein the plurality of adaptive active current limit circuitries is at least three adaptive active current limit circuitries.

\* \* \* \* \*